United States Patent [19]

Crapser

[11] Patent Number: 4,583,688
[45] Date of Patent: Apr. 22, 1986

[54] HOSE-END DISPENSER

[75] Inventor: James R. Crapser, Racine, Wis.

[73] Assignee: S. C. Johnson & Son, Inc., Racine, Wis.

[21] Appl. No.: 717,779

[22] Filed: Mar. 29, 1985

[51] Int. Cl.$^4$ .............................................. B05B 7/24
[52] U.S. Cl. .................................. 239/314; 222/134; 239/318; 239/353; 239/415; 239/426
[58] Field of Search ............... 239/310, 314, 315, 316, 239/318, 353, 414, 415, 426, 572; 222/134

[56] References Cited

U.S. PATENT DOCUMENTS

| | | |
|---|---|---|
| 549,678 | 11/1895 | Miller . |
| 1,964,576 | 6/1934 | Horne . |
| 2,030,853 | 2/1936 | Budwig . |
| 2,061,932 | 11/1936 | Budwig . |
| 2,153,240 | 4/1939 | Dailey et al. . |
| 2,293,390 | 8/1942 | Hengesback . |
| 2,316,781 | 4/1943 | Fox . |
| 2,544,539 | 3/1951 | Manders . |
| 2,571,871 | 10/1951 | Hayes . |
| 2,574,036 | 11/1951 | Henchert . |
| 2,663,467 | 12/1953 | Douglass et al. . |
| 2,744,791 | 5/1956 | Budwig . |
| 2,789,010 | 4/1957 | Dean . |
| 2,887,272 | 5/1959 | Rosenthal .......................... 239/310 |
| 2,925,989 | 2/1960 | Hempel . |
| 2,925,990 | 2/1960 | Hempel . |
| 2,925,991 | 2/1960 | Hempel . |
| 2,926,686 | 3/1960 | Gheen . |
| 2,940,673 | 6/1960 | Budwig . |
| 2,946,342 | 7/1960 | Dopplmaier . |
| 2,948,480 | 8/1960 | Budwig . |
| 2,951,645 | 9/1960 | Price et al. . |
| 2,965,309 | 12/1960 | Parrott . |
| 2,991,939 | 7/1961 | Packard . |
| 2,993,651 | 7/1961 | Packard . |
| 3,027,097 | 3/1962 | Gleason et al. . |
| 3,032,274 | 5/1962 | Budwig . |
| 3,042,314 | 7/1962 | Packard et al. . |
| 3,050,261 | 8/1962 | Littlefield . |
| 3,052,417 | 9/1962 | Daniel . |
| 3,053,499 | 9/1962 | Jones . |
| 3,058,626 | 10/1962 | Hibbs et al. . |
| 3,088,679 | 5/1963 | Ford . |
| 3,095,905 | 7/1963 | Glauber . |
| 3,099,394 | 7/1963 | Lynn . |
| 3,113,725 | 12/1963 | Packard et al. . |
| 3,180,580 | 4/1965 | Schedel . |
| 3,199,832 | 8/1965 | Calamia . |
| 3,254,844 | 6/1966 | Blasnik et al. . |
| 3,276,635 | 10/1966 | Webster .............................. 222/182 |
| 3,298,577 | 1/1967 | Chlystun . |
| 3,608,829 | 9/1971 | Forsman . |
| 3,717,324 | 2/1973 | Milde . |
| 3,794,294 | 2/1974 | Sherman . |
| 3,837,619 | 9/1974 | Sherman . |
| 3,940,069 | 2/1976 | Gunzel, Jr. et al. ................ 239/318 |
| 4,073,413 | 2/1978 | Tabler et al. . |
| 4,159,081 | 6/1979 | Demler et al. ...................... 239/415 |
| 4,349,157 | 9/1982 | Beiswenger et al. ............... 239/318 |
| 4,369,921 | 1/1983 | Beiswenger et al. ............... 239/318 |

Primary Examiner—Jeffrey V. Nase
Assistant Examiner—Michael J. Forman

[57] ABSTRACT

A hose-end valve device to control the flow of water from a garden hose and liquid from an attached pressurized container with a single motion. The control device includes a camming ring rotatably mounted on an extension of a hose coupling. Rotational movement of the camming ring with respect to a tubular member which is attached to an actuator panel causes axially interacting camming surfaces to change the relative axial positions of the ring and tubular member thereby opening or closing an axially movable water flow valve, depending on the direction of rotation. Rotational movement of the camming ring with respect to a fixed frame opening causes radially interacting camming surfaces to move the actuator panel radially which depresses or raises the valve stem of the pressurized container. A preferred axially movable valve is an accordion-like self-closing washer-valve.

20 Claims, 11 Drawing Figures

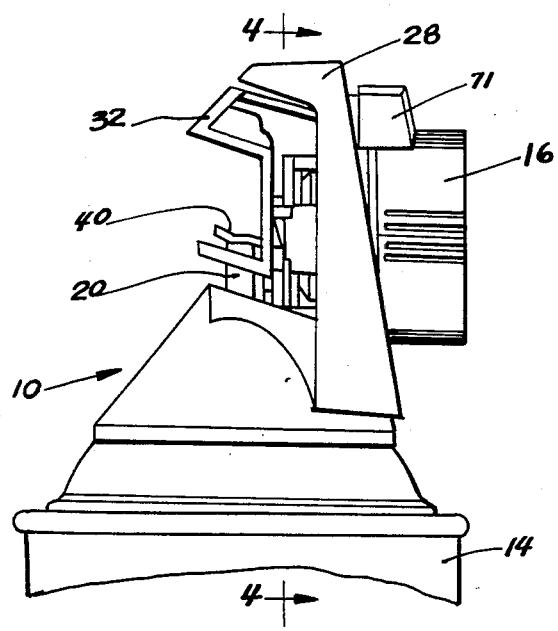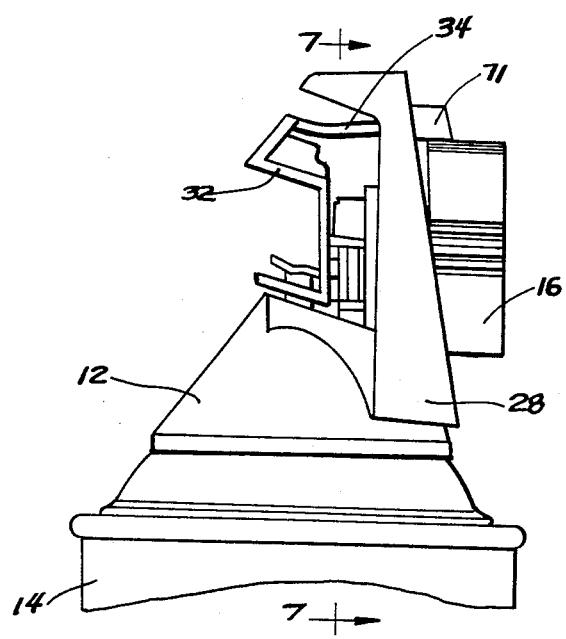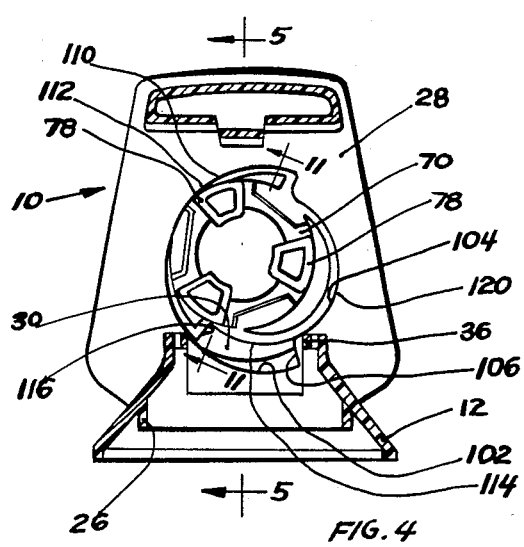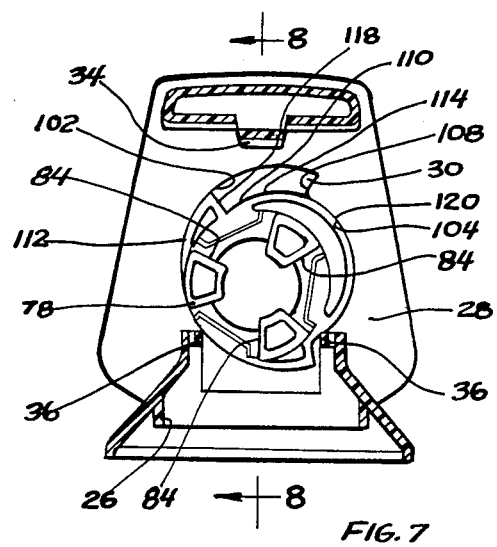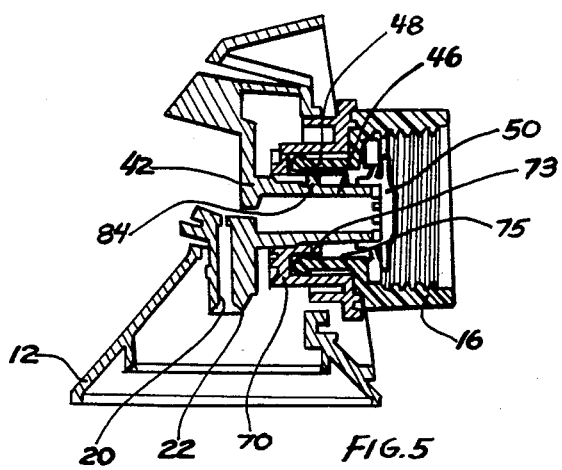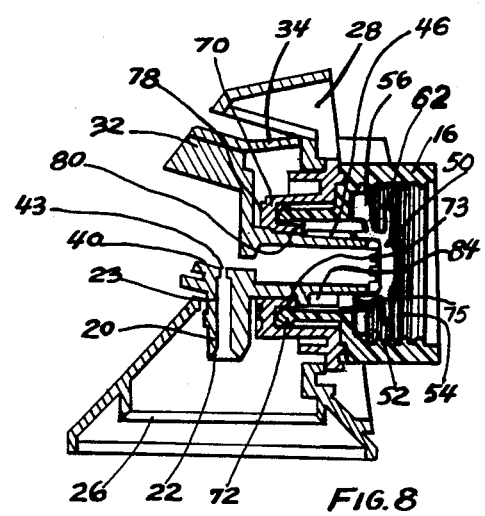

HOSE-END DISPENSER

FIELD OF THE INVENTION

This invention is related to dispensing of fluids from pressurized containers and, more specifically, to hose-end devices for spraying water with a product from a pressurized container attached at the end of the hose.

BACKGROUND OF THE INVENTION

Many kinds of hose-end devices have been used for dispensing a variety of products, particularly insecticides, fungicides, fertilizers and the like. Some hose-end dispensing devices have been developed for use in dispensing products from pressurized containers.

The prior art includes the disclosures of the following U.S. Pat. Nos.: 2,030,853; 2,061,932; 2,744,791; 2,887,272; 2,940,673; 2,948,480; 2,951,645; 3,027,097; 3,032,274; 3,042,314; 3,095 905; 3,199,832; 3,276,635; 3,608,829; 3,717,324; 4,349,157; and 4,369,921. There are few disclosures of pressurized container dispensing through hose-end devices.

Among the principal problems with such devices are leakage, lack of satisfactory control of the flow of water and pressurized product and difficulty in starting and stopping such flow. Some of such devices are of limited usefulness because their size or high cost make them unsatisfactory for one-time disposable use. There has long been a need for an improved hose-end dispenser for pressurized products which is simple, clean and reliable in operation and which is of low-cost construction.

SUMMARY OF THE INVENTION

This invention is a hose-end valve device for controlling the flow of water from a hose and liquid from an attached pressurized container. The device includes a collar securing it to the container, a conduit engaging the depressible valve stem of the pressurized container, a hose coupling with its axis transverse the line defined by the valve stem, and a control device between the coupling and the collar. The improvement is primarily in the control device.

The control device includes a frame affixed to the collar and forming an opening axially aligned with the hose coupling. An actuator panel is hinged to the frame for reciprocating movement along the line defined by the valve stem. The panel has a mixing zone toward which a water outlet adjacent thereto is directed. The conduit, which has an upstream end engaging the valve stem of the pressurized container, is affixed to the panel and has its downstream (outlet) end adjacent to such zone. The water and pressurized product mix at the mixing zone.

The actuator panel has a tubular member affixed to it in position upstream of the water outlet and extending axially through the frame opening and into the hose coupling. The hose coupling has an annular extension affixed to it about which a camming ring is rotatably mounted.

Within the hose coupling is an axially movable water flow control member. It is operated when a portion of it is displaced in an axial direction by the tubular member through a camming action to be described. A preferred control member is an accordian-like elastic member which will be described hereafter.

The flow of water and of pressurized product is controlled by camming devices involving the camming ring, the tubular member, and the edge of the frame opening.

Axially interacting camming surfaces on the tubular member and the camming ring cause relative axial movement of the tubular member with respect to the ring and hose coupling when the rotational position of the ring is changed. "Axially interacting" means that the camming surfaces cause relative movement along the axis of the hose coupling. This changes the degree of insertion of the tubular member into the coupling to operate the control means.

Radially interacting camming surfaces on the frame opening and the camming ring cause relative movement of the actuator panel with respect to the ring and hose coupling in a radial direction when the rotational position of the ring is changed. "Radially interacting" means that the camming surfaces involved cause relative movement along a radius of the hose coupling, that is, in a direction along the line of the valve stem, which as previously noted, is transverse the axis of the hose coupling. This movement causes the conduit, which is affixed to the actuator panel and attached to the valve stem, to depress or raise the valve stem and thereby control the dispensing of product from the container.

In preferred embodiments of this invention there are two sets of axially interacting camming surfaces on the tubular member and camming ring. One set is operable upon rotation of the camming ring in one direction and the other set is operable upon rotation of the camming ring in the other direction. One opens the axially movable water flow control means and the other allows closing thereof.

The radially interacting camming surface on the camming ring is a peripheral edge thereof which is out-of-round. The camming ring and the frame opening preferably have stops to limit the full extent of rotational motion of the camming ring. The stops may be radial surfaces on the frame opening and the peripheral edge of the camming ring which engage each other at the end of the permissible rotational motion.

It is highly preferred that the interacting camming surfaces be arranged such that rotational movement of the camming ring from one stop position toward the other first start water flow and thereafter start flow of liquid from the container and such that the reverse rotational movement first shut off the flow of liquid from the container and then shut off the flow of water.

The preferred water flow control member which was previously mentioned is a unitary elastic member having three portions, an annular washer portion, a center button portion, and an interconnecting portion. The annular washer portion is secured between the lip of the hose and an annular ledge inside the hose coupling, much like any washer use with a garden hose. The washer portion has an inner edge from which the interconnection portion extends to connect with the button. The interconnecting portion includes apertures for radial water flow and a flexible webbing which allows the button portion to move axially with respect to the washer portion.

The button portion is engaged by the tubular member which moves it in an upstream direction away from the washer portion during rotational movement of the camming ring in one direction. This movement opens the apertures in the interconnecting portion to water flow from the hose. Water flows through these apertures and from there through openings in the tubular member near the end thereof. Such openings are most preferably formed by a toothed edge at the end of the tubular member.

When the camming ring is returned in the opposite direction, the tubular member is withdrawn from it contact with the button portion. This allows the water pressure in the hose to move the button portion in a downstream direction until it engages the inner edge of the washer portion to close the elastic member to water flow.

Another preferred embodiment of the invention includes a peripheral lever attached to, or formed with, the camming ring and positioned near the hose coupling for convenient operation.

In another preferred embodiment the camming ring is snap-fit onto the annular extension and snap-fit onto the tubular member. In another highly preferred embodiment, the actuator panel and the frame are hinged together by plastic hinges which are integrally formed with the panel and frame. Most preferably, the collar, the frame and conduit, the actuator panel and the tubular member are integrally formed, such as by plastic molding.

The hose-end valve device of this invention is simple and reliable in operation. It may be operated with one hand. It gives good control of the flow of water and pressurized product. Furthermore, the device may be made inexpensively such that it is satisfactory for disposable use.

OBJECTS OF THE INVENTION

An object of this invention is to improve hose-end valve devices of the type for controlling the flow of water and the flow of liquid from an attached pressurized container.

Another object of this invention is to provide a low-cost hose-end valve device which is simple and reliable in operation.

Another object of this invention is to provide a hose-end valve device which is not prone to leakage problems.

Another object of this invention is to provide a hose-end valve device which may be operated without difficulty and which provides good control of water and pressurized product flow.

These and other important objects of the invention will be apparent from the following further descriptions and from the accompanying drawings wherein:

BRIEF DESCRIPTION OF THE DRAWINGS

FIG. 3 is a fragmentary left side elevation, illustrating the device in the fully "off" position.

FIG. 4 is a left sectional of FIG. 3, taken along section 4—4 as indicated in FIG. 3.

FIG. 5 is a right sectional of FIG. 4, taken along section 5—5 as indicated in FIG. 4.

FIGS. 6, 7 and 8 are views similar to FIGS. 3, 4 and 5, but illustrate the device in the fully "on" position.

DETAILED DESCRIPTIONS OF PREFERRED EMBODIMENTS

Figure 1:
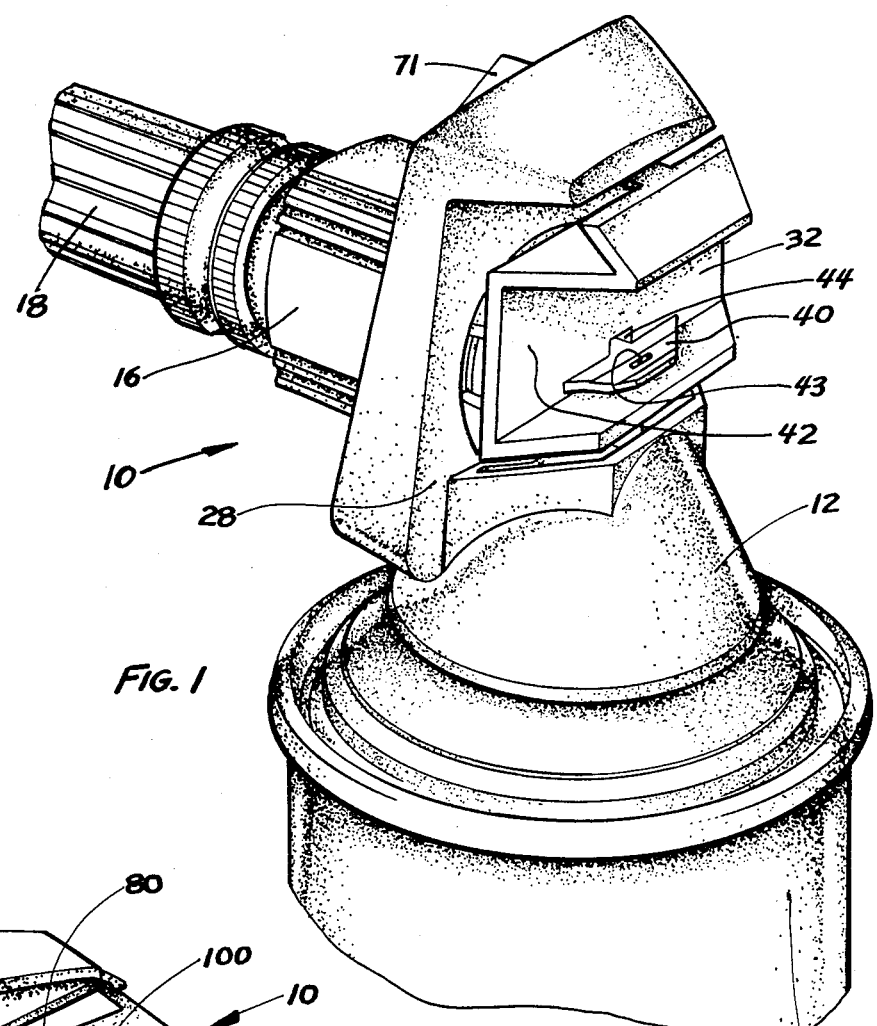
FIG. 1 is a front three-fourths perspective of the device of this invention attached to a garden hose.

The figures all illustrate a preferred hose-end valve device 10 in accordance with this invention. Hose-end device 10 has a collar 12 by which it is attached to aerosol container 14, a hose coupling 16 by which it is attached to garden hose 18 (see FIG. 1), and an aerosol product flow conduit 20 attached at its upstream end 22 (its lower end when the container is in an upright position) to the depressible valve stem 24 (see FIG. 2) which protrudes from container 14 and through which the aerosol product exits container 14 when it is depressed.

Hose coupling 16 is oriented such that the axis which it defines is transverse to the line of valve stem 24. Thus, the water exiting hose 18 and the aerosol product exiting container 14 are moving toward a point of mixture beyond which they are sprayed together onto the intended target. Hose-end device 10 controls the flow of water, the flow of aerosol product, the mixing and the spraying.

Collar 12, which has annular snap-fit ring 26 for attaching it to the valve cup bead (not shown) of container 14, is the principal structural part upon which hose-end device 10 is built. Another principal structural part is frame 28 which is affixed to (preferably integrally molded with) collar 12 and which forms an opening 30 (see FIGS. 4 and 7) axially aligned with hose coupling 16. Frame 28 and opening 30 are laterally offset from the line of valve stem 24.

A principal controlling part of hose-end device 10 is the actuator panel 32 (see in particular FIG. 10) which is hinged to frame 28 and generally in line with valve stem 24. Actuator panel 32 is movable, along the line of valve stem 24, on three hinges, including upper hinge 34 and two lower hinges 36 (see FIGS. 4, 7 and 10). Upper hinge 34 connects actuator panel 32 directly to frame 28, while lower hinges 36 connect actuator panel 32 to collar 12 at a point near the juncture of collar 12 and frame 28. Actuator panel 32 is preferably integrally formed wih frame 28 and collar 12.

Conduit 20 is affixed at its downstream end 23 (its upper end when the container is in upright position) to actuator panel 32. Conduit 20 is positioned to be joined, at its upper end as previously noted, in fluid flow relation with valve stem 24. Conduit 20 is preferably integrally formed with actuator panel 32.

Actuator panel 32 also forms a mixing zone 38 (see FIG. 10) which is bounded by a mixing platform 40 and a water outlet wall 42 adjacent thereto. Mixing platform 40 defines an upwardly facing aerosol product outlet 43 (see FIG. 1) at downstream end 23 of conduit 20. Water outlet wall 42 defines a laterally-facing water outlet 44 (see FIG. 1) which directs water to intersect with the upward flow of aerosol product exiting aerosol product outlet 43. This allows the water to entrain the aerosol product and mix with it, while the greater pressure and volume of water flow determines the direction in which the mixture is sprayed.

A tubular member 46 (see FIG. 10) is affixed to the upstream side 45 of water outlet wall 42 of actuator panel 32, and forms a part of actuator panel 32. Tubular member 46 extends upstream of water outlet 44, in fluid flow relation therewith, in a direction generally along the axis of hose coupling 16, through frame opening 30 and into hose coupling 16. Coupling 16 has an annular extension 48 (see FIG. 9) which extends from the main portion 49 of coupling 16 in a downstream direction toward actuator panel 32. Annular extension 48 is of reduced diameter in comparison with main portion 49 of coupling 16. Tubular member 46 extends completely through annular extension 48 and into main portion 49, as illustrated in FIGS. 5 and 8.

Figure 9:
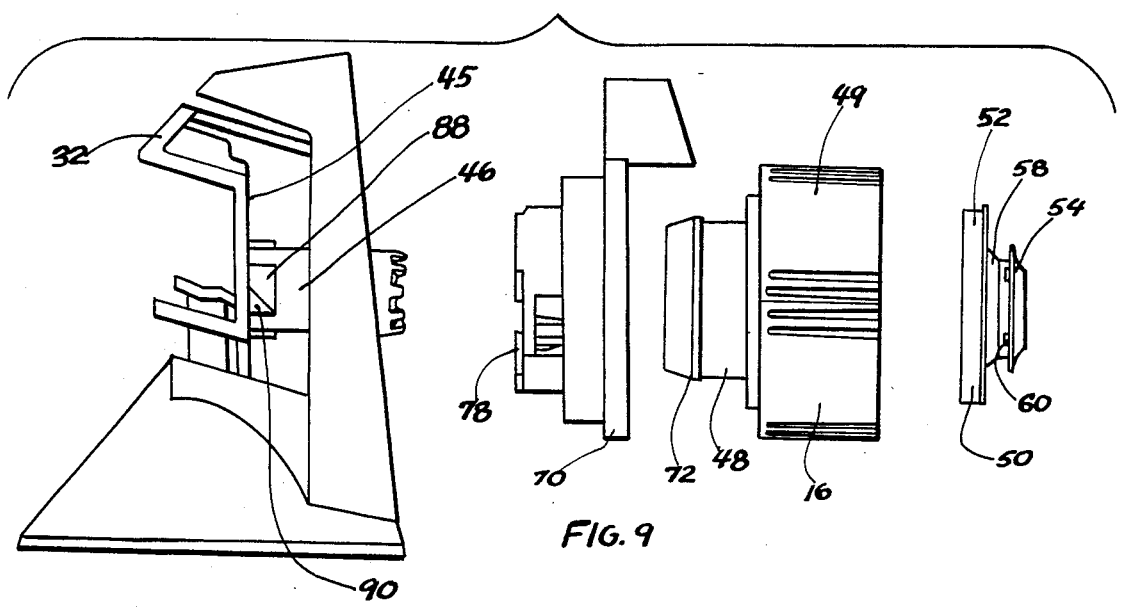
FIG. 9 is an enlarged exploded side elevation of FIG. 1, with the garden hose and container missing.

Inserted into the hose-receiving end of main portion 49 of hose coupling 16 is an elastic water flow control member 50, shown best in FIGS. 5, 8 and 9. Flow control member 50 has an annular washer portion 52 which is positioned for engagement with the terminal end edge of garden hose 18, as with any garden hose washer. Flow control member 50 also has a center button portion 54 which is connected to the radially inner edge 56 of washer portion 52 by an interconnecting portion 58, as shown in FIGS. 8 and 9.

Figure 2:
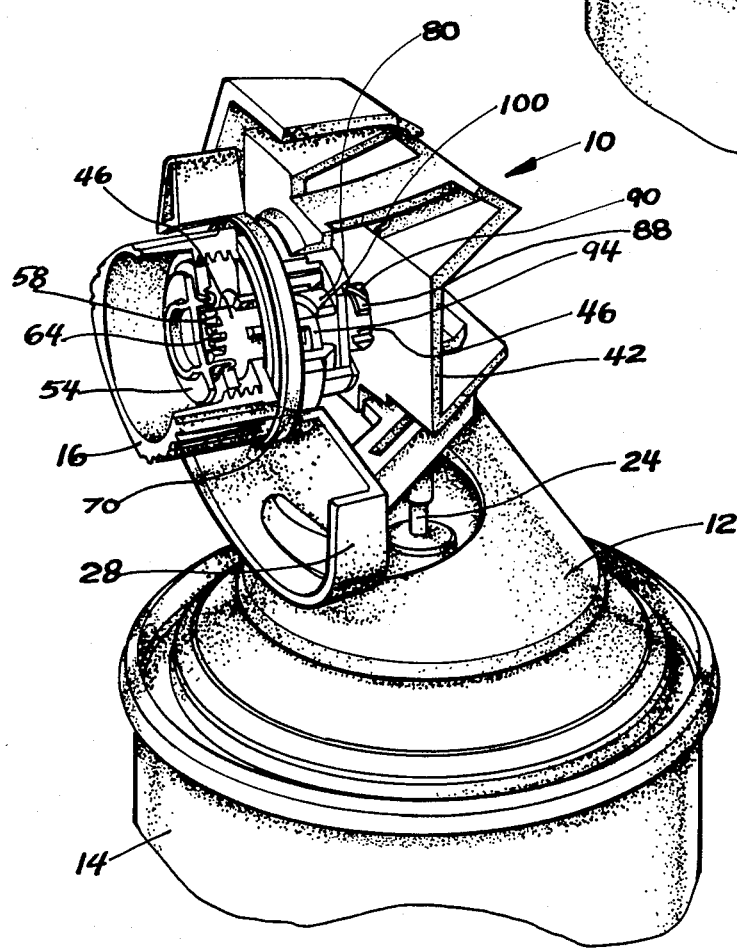
FIG. 2 is a rear three-fourths cutaway perspective with the garden hose removed.

Interconnecting portion 58 includes apertures 60 allowing water flow and a flexible webbing 62 which allows axial movement of button portion 54 with respect to washer portion 52. The diameter of button portion 54 is greater than the diameter of inner edge 56 of washer portion 52, such that when button portion 54 is in a downstream axial position against washer portion 52, as illustrated in FIGS. 2 and 5, the flow of water through elastic flow control member 50 is blocked. When, however, button portion 54 is displaced to an upstream position away from washer portion 52, as illustrated in FIGS. 8 and 9, water may pass through apertures 60, which are spaced around the flow control member 50, to pass through tubular member 46 and ultimately exit through water outlet 44.

Figure 10:
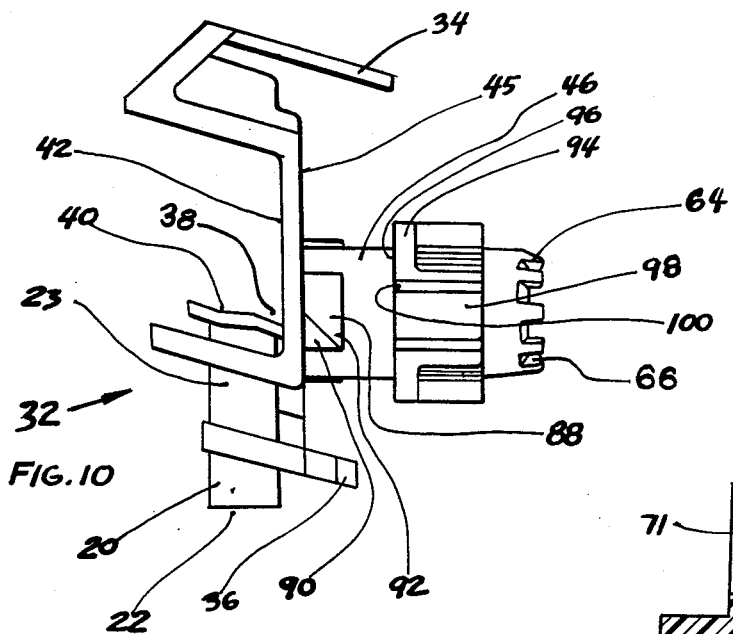
FIG. 10 is an enlarged elevation of the actuator panel portion of FIG. 3.

The position of button portion 54 with respect to washer portion 52 is determined by the degree of insertion of tubular member 46 into hose coupling 16. Tubular member 46 has spaced teeth 64 (see FIG. 10) at its end which define openings 66 near such end. Openings 66 serve to allow water flow into tubular member 46 when its end is engaging button portion 54 to hold it in its upstream position and thereby allow water flow through apertures 60. Such water flow is possible when tubular member 46 is inserted to the fullest extent into hose coupling 16, and water flow is reduced as the degree of insertion is reduced.

When tubular member 46 is withdrawn to some extent from hose coupling 16 (that is, hose coupling 16 is pushed away from tubular member 46), water pressure in hose 18 causes button portion 54 to move in a downstream direction until, upon full withdrawal, button portion 54 comes into sealing engagement with washer portion 52, as shown in FIGS. 2 and 5, thereby shutting off the water flow.

Just as the flow of water is determined by the relative axial positions of hose coupling 16 and tubular member 46, the flow of aerosol product is determined by the relative radial positions of frame 28 and aerosol product flow conduit 20.

As noted, both tubular member 46 and aerosol product conduit 20 are affixed to actuator panel 32. As actuator panel 32 moves up and down with respect to frame 28, valve stem 24 moves up and down and sets the rate of product flow from container 14. As actuator panel 32 moves axially back and forth with respect to coupling 16, button portion 54 of elastic flow control member 50 moves axially back and forth and sets the water flow rate.

A camming ring 70 (see FIGS. 9 and 11, in particular) is rotatably attached around annular extension 48. Annular extension 48 has an outwardly flaring bead 72 at its downstream end which allows camming ring 70 to be snap fitted over it into rotational engagement with extension 48. After initial assembly, camming ring 70 and annular extension 48 are in axially fixed positions one to the other.

The subassembly of camming ring 70 and coupling 16 are rotatably attached to tubular member 46 but allowed to move axially back and forth with respect to actuator panel 32. The inner surface of annular extension 48 (see FIG. 5) incorporates an inward flaring bead 73 at its downstream end. The bead being smaller in diameter than tubular wall 75 and sector blocks 94 (see FIG. 10) provides a snap fit when camming ring 70 and hose coupling 16 are assembled in the "off position."

Camming ring 70 has a radially outward tab 71 which may be pushed by the operator's finger or fingers to set the rotational position of camming ring 70. Tab 71 is preferably integrally formed with the remaining portion of camming ring member 70. The rotational position of camming ring 70 with repect to tubular member 46 and frame opening 30 determines the flow of water and aerosol product, respectively, as the interactions of various surfaces and edges dictate relative axial and radial positions of certain parts, all of which will hereafter be described.

A detailed description of tubular member 46 and camming ring 70 now follows. These are the parts which, by their interaction upon rotation of camming ring 70, determine their relative axial positions and operate elastic flow control member 50 to control the flow of water from garden hose 18.

The downstream end 74 of camming ring 70 has three multisurface camming elements 76 spaced at 120 degree intervals. Various surfaces and edges of camming elements 76 interact with other surfaces and edges on tubular member 46 to cause relative axial movement (that is, along the axis of hose coupling 16) between tubular member 46 and the axially-joined combination of camming ring 70 and hose coupling 16 to change the degree of insertion of tubular member 46 into hose coupling 16. This opens and closes flow control member 50, as previously described.

Figure 11:
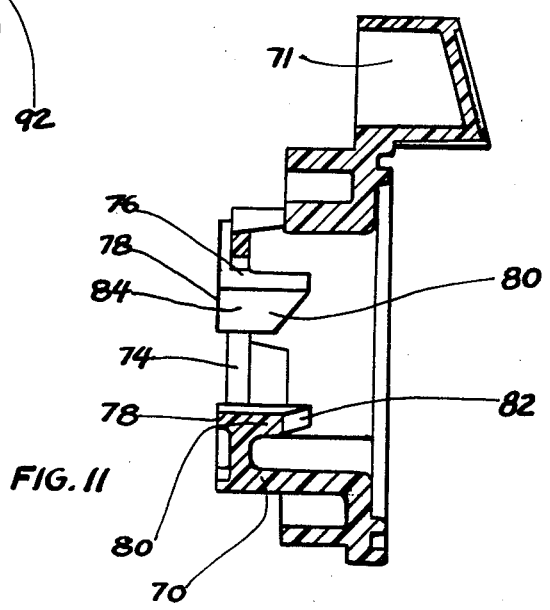
FIG. 11 is an enlarged sectional view of the camming ring, taken along section 11—11 as indicated in FIG. 4.

The three multi-surface camming elements 76 each have a raised butt end 78 at downstream end 74 of camming ring 70, and a hook portion 80 (see FIGS. 2 and 11). Each butt end 78 extends radially inwardly over the beaded downstream end of annular extension 48, and the related hook portion 80 is affixed to the radially inward portion of butt end 78 and extends in an axial upstream direction to terminate in a ramp surface 82 (see FIG. 11). Each hook portion 80 has a radially inwardly facing surface (or "inner surface") 84. Each raised butt end 78 has a radial lead edge 86. Lead edge 86, inner surface 84, and butt end 78 are the surfaces and edges of camming ring 70 which interact with various functional surfaces and edges of tubular member 46.

The functional surfaces and edges of tubular member 46 include three rectangular raised pads 88 (see FIGS. 2, 9 and 10) immediately adjacent to upstream side 45 of water outlet wall 42. In a preferred embodiment in which the diameter of tubular member is about 0.400 inch, pads 88 are raised by about 0.016 inch. On the end of each raised pad 88 is a small triangular pad 90 (see FIGS. 2, 9 and 10) raised still further. In the preferred embodiment mentioned, pads 90 are raised by about another 0.032 inch, that is, about 0.048 inch above the principal diameter of tubular member 46. Triangular pads 90 each have a diagonal ramp surface 92 (see FIGS. 9 and 10) wrapping around tubular member 46 for a few degrees, and having a radially inner edge on rectangular pad 88.

Further upstream on tubular member 46, and spaced at 120 degree intervals in locations aligned with the spaces between rectangular pads 88, are three sector blocks 94. Sector blocks 94 have downstream-facing front surfaces 96 and define spaces 98 therebetween (see FIG. 10) each of which are dimensioned to receive a hook portion 80 of camming ring 70. Front surfaces 96, one radial edge 100 of each of the front surfaces 96, rectangular pads 88, and diagonal ramp surfaces 92 all serve to interact with parts of camming ring 70, as hereafter more fully described.

Now, before describing such interaction, a detailed description of frame opening 30 and camming ring 70, as they relate to their interaction, will be given. These are the parts which, by their interaction upon rotation of camming ring 70, determine their relative radial positions and hence serve to radially move actuator panel 32, aerosol product flow conduit 20 and valve stem 24 to control the flow of aerosol product from container 14.

FIGS. 4 and 7 illustrate the pertinent characteristics of frame opening 30 and camming ring 70 best. Frame opening 30 has radially inwardly facing major and minor cam portions 102 and 104, respectively. An "on-stop" 106 and an "off-stop" 108, both of which are generally radial portions of the edge of frame opening 30, divide major cam portion 102 from minor cam portion 104.

Major cam portion 102 has a variable radius. That radius is smallest near the midpoint of major cam portion 102. It increases at positions progressively closer to off-stop 108, but increases by a greater amount at positions progressively closer to on-stop 106. The radius of minor cam portion 104 gradually increases from off-stop 108 to positions progressively closer to on-stop 106.

Camming ring 70 has a radially outwardly facing cam follower surface 110 extending therearound at a position upstream of multisurface camming elements 76, previously described. Cam follower surface 110 has major and minor cam follower portion 112 and 114, respectively. Cam follower surface 110 also includes on-stop ledge 116 and off-stop ledge 118, both of which are generally radial portions of cam follower surface 110. Ledges 116 and 118 divide major cam follower portion 112 from minor cam follower portion 114, and are engageable with on-stop 106 and off-stop 108, respectively.

Major cam follower portion 112 and minor cam follower portion 114 are each symmetrical about lines dividing their respective midpoints from their ends, as defined by ledges 116 and 118. Minor cam follower portion 114 has a greater radius at its midpoint 120 than at points on either side thereof, and its radius decreases at points progressively closer to its ends. Major cam follower surface 112 has a smaller radius at its midpoint than at points on either side thereof, and its radius increases at points progressively closer to its ends.

Now that all functional parts of the device of this invention have been described, the manner of interaction of all the camming and bearing surfaces and edges of this embodiment of the camming and bearing surfaces and edges of this embodiment of the invention will be more fully understood by a description of the operation of the device. FIGS. 3, 4 and 5 illustrate the fully off position, while FIGS. 6, 7 and 8 illustrate the fully on position.

In the fully off position, the rotational position of camming ring 70 with respect to frame opening 30 and tubular member 46 are such that the following conditions are in effect:

Hook portions 80 of multi-surface camming elements 76 or camming ring 70 are fully received into the spaces 98 between sector blocks 94 of tubular member 46, as shown in FIG. 2. This means that tubular member 46 is withdrawn from hose coupling 16 to the greatest extent possible, which in turn means that the toothed upstream end of tubular member 46 is not holding center button portion 54 of elastic flow control member 50 in an upstream position. Therefore, the water pressure in hose 18 has pushed button portion 54 downstream causing it to seal against washer portion 52 of elastic member 50. Thus, the water is fully "off."

Off-stop ledge 118 is against off-stop 108 so that further rotation in the "off" direction is not possible. The midpoint 120 of minor cam follower portion 114 of camming ring 70 is bearing against a point of minor cam portion 104 which is near on-stop 106, and major cam follower portion 112 is thereby held against the part of major cam portion 102 nearest off-stop 108. Thus, camming ring 70, tubular member 46, actuator panel 32, aerosol product flow conduit 20 and valve stem 24 are held in an "up" position so there is no flow of aerosol product.

Axial movement of the camming ring 70, hose coupling 16, and seal portion 52 of elastic member 50 is prevented from inadvertently occurring by the interaction of additional surface edges. The radial lead edge 86 (see FIG. 11) of raised butt 78 is smaller in diameter than the upstream radial edge of raised pads 88. (see FIG. 10) The interference of these edges requires deflection of the butt end portion 78 of camming ring 70 to allow downstream movement of camming ring 70, hose coupling 16, and seal portion 52 thus approaching "on position." (see FIGS. 5 and 8)

As an operator begins to move tab 71 from the "off" position to the "on" position (movement away from the viewer in FIGS. 3 and 6), camming ring 70 rotates with respect to tubular member 46 and frame opening 30. Such rotation is in a counterclockwise direction as viewed in FIGS. 4 and 7.

As such rotation occurs, ramp surfaces 82 of hook portions 80, which are part of camming ring 70, exert wedging force on radial edges 100 of sector blocks 94, which are part of tubular member 46. This wedging action forces relative axial movement of tubular member 46 with respect to hose coupling 16, such that tubular member 46 is in a position of greater insertion into hose coupling 16. When this insertion movement progresses far enough, the toothed upstream end of tubular member 46 engages button portion 54 of elastic flow control member 50 and displaces it in an upstream direction. This exposes apertures 60 to the flow of water, which then continues to flow into tubular member 46 through openings 66 between teeth 64, and from there through water outlet 44 into and through mixing zone 38.

As such insertion movement continues, butt ends 78 of multisurface camming elements 76 will approach upstream side 45 of water outlet wall 42. During this movement, radially inner surfaces 84 of hook portions 80 will mount rectangular raised pads 88 of tubular member 46. In the fully on position, radial lead edges 86 of butt ends 78 will just drop off the ends of rectangular raised pads 88, giving a change of rotational resistance indicating that the device has reached or about reached the fully on condition. These features also hold the camming ring in the fully on position and prevent accidental rotation and axial movement due to water pressure against elastic flow control member 50.

Other interactions are occurring during the rotation of camming ring 70 from the off position to the on position. The midpoint 120 of minor cam follower portion 114 of camming ring 70 eventually moves to a point of minor cam portion 104 which is near off-stop 108, which is a point of minor cam portion 104 of reduced radius. This combination of the long-radius midpoint 120 being against the short-radius portion of minor cam portion 104 drives camming ring 70, tubular member 46, actuator panel 32, aerosol product flow conduit 20 and valve stem 24 in a downward direction to start the flow of aerosol product up conduit 20 to exit aerosol product outlet 43 at mixing platform 40.

As movement toward the fully on position continues, the downward movement continues, which increases the flow of aerosol product. The fully on position is reached when on-stop ledge 116 engages on-stop 106. At that point, the ends of hook portions 80 have passed radial edges 100 of sector blocks 94 and have come to bear on front surfaces 96 of sector blocks 94, which serves as further means to hold the device in the fully on position.

During dispensing of water and aerosol product, the water entering mixing zone 38 entrains the aerosol product entering mixing zone 38, and the two intermix and are sprayed outwardly together by virtue of the pressure of the water stream.

The arrangement and configuration of the various interacting surfaces and edges of the device of this invention are preferably such that, during rotation of tab 71 and camming ring 70 from the fully off position to the fully on position, the flow of water begins well before the flow of aerosol product. Water will direct the aerosol product toward the intended target whenever dispensing of product is in progress.

As the operator begins to move tab 71 from the on position to the off position (movement toward the viewer in FIGS. 3 and 6 and clockwise rotation as viewed in FIGS. 4 and 7), the long-radius midpoint portion 120 of minor cam follower portion 114 of camming ring 70 moves toward that part of minor cam portion 104 which is near on-stop 106. This drives camming ring 70, tubular member 46, actuator panel 32 and aerosol product flow conduit 20 in an upward direction, and allows the normal upward spring action of valve stem 24 to at first retard and then to stop the flow of aerosol product from container 14.

Well before off-stop ledge 118 contacts off-stop 108, the flow of aerosol product will have ceased. The engagement of off-stop ledge 118 with off-stop 108 defines the point at which all useful interactions of camming ring 70 with either frame opening 30 or tubular member 46 have been completed.

The interactions occurring between camming ring 70 and tubular member 46 during the rotation of camming ring 70 from the on position to the off position are as follows:

At first, the far upstream ends of hook portion 80 slide off front surfaces 96 of sector blocks 94, passing over radial edges 100. This then allows hook portions 80 to enter spaces 98 between sector blocks 94 to accommodate the relative axial withdrawal of tubular member 46 from its position in coupling 16. Also, as rotational movement away from the fully on position begins, the radial lead edges 86 of butt ends 78 of camming ring 70 move onto rectangular raised pads 88 and radially inner surfaces 84 of hook portions 80 engage raised pads 88.

As the rotational movement continues, radial lead edges 86 engage ramp surfaces 92 of triangular pads 90 at an axial position relatively near upstream side 45 or water outlet wall 42. Continued rotation causes lead edges 86 to move along ramp surfaces 92, and this action drives camming ring 70 and hose coupling 16 in an upstream direction with respect to tubular member 46 and actuator panel 32. This, of course, progressively withdraws the toothed upstream end of tubular member 46 from its contact with center button portion 54 and allows the water pressure in hose 18 to continue closing elastic flow control member 50. Eventually, upon completion of the withdrawal action, center button portion 54 will tightly engage washer portion 52 and completely close flow control member 50 to the flow of water.

Near the completion of the rotational movement from the on position to the off position and the resulting relative axial movement, the radially inner surfaces 84 of hook portions 80 will slide off rectangular raised pads 88 in an upstream direction. This will cause a change in the resistance to rotation, thereby indicating that the device is near the fully off position.

The end of the movement toward the fully off position is marked by the engagement of off-stop ledge 118 with off-stop 108. At that point, the water flow is completely off. The flow of aerosol product had previously ceased.

The device is preferably constructed of plastic molded parts. In the most preferred embodiment, which is illustrated, collar 12, frame 28, conduit 20, actuator panel 32, upper hinge 34, lower hinges 32 and tubular member 46 are integrally molded. A highly preferred material is 30% glass-filled polypropylene. Camming ring 70 and finger tab 71 are integrally molded as well, preferably of polypropylene. Hose coupling 16 and its annular extension 48 are also integrally molded, preferably of polypropylene.

Elastic flow control member 50 is preferably a single piece of thermoplastic rubber, such as that sold under the trademark SANTOPRENE by Monsanto, St. Louis, Mo.

The complex control of the flow of water and an aerosol product is provided in a device which, in its most preferred form, has only four parts. The device, therefore, may easily be assembled. And because the parts are plastic moldings, the cost of the device is low.

The hose-end valve device of this invention may be used for spraying a variety of products which are preferably applied with water. Garden sprays, such as pesticides and fungicides for trees and bushes, are examples.

While the principles of this invention have been described in connection with specific embodiments, it should be understood clearly that these descriptions are made only for purposes of illustration and are not intended to limit the scope of this invention.

What is claimed is:

1. In a hose-end valve device for controlling flow of water from a hose and liquid from an attached container, of the type having a collar secured to the container, a conduit with its upstream end engaged to a depressible valve stem of the container, a hose coupling with its longitudinal axis transverse the valve stem, and control means between the coupling and collar for regulating the flow of water through the device, the improvement comprising:
- a frame affixed to the collar and forming an opening axially aligned with the longitudinal axis of the coupling;
- an actuator panel hinged to the frame for movement in line with the valve stem, the panel having a mixing zone and a water outlet adjacent to such zone, the conduit being affixed to the panel with its downstream end adjacent to such zone;
- a tubular member affixed to the panel upstream of the water outlet and extending axially through the frame opening and into the coupling;
- an annular extension affixed to the coupling;
- a camming ring rotatably attached to the extension;
- axially movable means in the coupling to control water flow;
- axially interacting camming surface means on the tubular member and ring whereby changing rotational positions of the ring changes the degree of insertion of the tubular member into the coupling to operate the control means; and
- radially interacting camming surface means on the frame opening and ring whereby changing rotational positions of the ring moves the panel and conduit along the line of the valve stem to control dispensing from the container.

2. The device of claim 1 wherein the ring has a peripheral lever to control its rotational position.

3. The device of claim 1 wherein there are two sets of axially interacting camming surface means on the tubular member and ring, one set operable upon rotation of the ring in one direction for greater insertion of the tubular member to open the water flow control means and another set operable upon rotation of the ring in the other direction for less insertion of the tubular member to close the water flow control means.

4. The device of claim 1 wherein the radially interacting camming surface means on the ring is a peripheral edge which is out-of-round.

5. The device of claim 4 wherein the frame opening and the peripheral edge of the ring have stop means to limit the full extent of rotational motion of the ring.

6. The device of claim 5 wherein the interacting camming surface means are arranged such that rotational movement of the ring from one stop position toward the other will first start water flow and thereafter start flow of liquid from the container and the reverse movement will first shut off the flow of liquid from the container and then shut off the flow of water.

7. The device of claim 1 wherein the camming ring is snap-fit onto the annular extension and snap-fit onto the tubular member.

8. The device of claim 1 wherein the panel and frame are hinged together by plastic hinges integrally formed with the panel and frame.

9. The device of claim 8 wherein the collar, the frame, the conduit, the actuator panel and the tubular member are integrally formed.

10. The device of claim 1 wherein the means to control water flow is an elastic member having an annular washer portion with a radially inner edge, a center button portion engagable with the inner edge, and an interconnecting portion between the inner edge and the button portion, said interconnecting portion including apertures for water flow and a flexible webbing to allow axial movement of the button portion with respect to the washer portion, said tubular member engaging the button portion to move it in an upstream direction away from the washer portion thereby opening the elastic member to water flow and, upon withdrawal of the tubular member from contact with the button portion, the button portion being movable by water pressure in a downstream direction into engagment with the washer portion to close the elastic member to water flow.

11. The device of claim 10 wherein the tubular member has openings near its upstream end to allow water flow into it.

12. The device of claim 11 wherein the tubular member has said upstream end with a toothed edge to allow water flow into it.

13. The device of claim 12 wherein the ring has a peripheral lever to control its rotational position.

14. The device of claim 13 wherein there are two sets of axially interacting camming surface means on the tubular member and ring, one set operable upon rotation of the ring in one direction for greater insertion of the tubular member to open the water flow control means and another set operable upon rotation of the ring in the other direction for less insertion of the tubular member to close the water flow control means.

15. The device of claim 14 wherein the radially interacting camming surface means on the ring is a peripheral edge which is out-of-round.

16. The device of claim 15 wherein the frame opening and the peripheral edge of the ring have stop means to limit the full extent of rotational motion of the ring.

17. The device of claim 16 wherein the interacting camming surface means are arranged such that rotational movement of the ring from one stop position toward the other will first start water flow and thereafter start flow of liquid from the container and the reverse movement will first shut off the flow of liquid from the container and then shut off the flow of water.

18. The device of claim 17 wherein the camming ring is snap-fit onto the annular extension and snap-fit onto the tubular member.

19. The device of claim 18 wherein the panel and frame are hinged together by plastic hinges integrally formed with the panel and frame.

20. The device of claim 19 wherein the collar, the frame, the conduit, the actuator panel and the tubular member are integrally formed.

* * * * *